United States Patent [19]

Wrasidlo et al.

[11] 4,413,074

[45] Nov. 1, 1983

[54] HYDROPHILIC SURFACES AND PROCESS FOR MAKING THE SAME

[75] Inventors: Wolfgang J. Wrasidlo; Karol J. Mysels, both of La Jolla, Calif.

[73] Assignee: Brunswick Corporation, Skokee, Ill.

[21] Appl. No.: 342,068

[22] Filed: Jan. 25, 1982

[51] Int. Cl.³ ..................... C08L 1/28; C08F 253/00; B05D 5/00
[52] U.S. Cl. .................... 524/43; 525/54.21; 525/54.23; 264/48; 427/244; 427/246; 210/490
[58] Field of Search ............... 524/27, 43; 525/54.21, 525/54.23, 906; 526/238.21; 521/64, 905; 264/41, 48; 427/244, 245, 246; 210/490

[56] References Cited

U.S. PATENT DOCUMENTS

| | | | |
|---|---|---|---|
| 4,199,445 | 4/1980 | Chiang et al. | 210/23 R |
| 4,203,848 | 5/1980 | Grandine | 210/490 |
| 4,279,846 | 7/1981 | Ishii et al. | 264/41 |
| 4,302,334 | 11/1981 | Jakabhazy et al. | 521/905 |
| 4,307,135 | 12/1981 | Fox | 264/41 |

OTHER PUBLICATIONS

"Membrane Filter Products and Services Available to Original Equipment Manufactures", Gelman Sciences, OEM Products, Ann Arbor, Mich.

*Primary Examiner*—John Kight, III
*Assistant Examiner*—Nathan M. Nutter
*Attorney, Agent, or Firm*—Edward D. O'Brian; K. H. Boswell

[57] ABSTRACT

A hydrophilic surface can be provided on a hydrophobic polymer surface by contacting the hydrophobic surface with a solution of a hydroxyalkyl cellulose and a perfluorocarbon surfactant in water or a mixture of water and one or more aliphatic alcohols so as to form a layer of the solution on the hydrophobic surface and then heating the surface coated with the layer so as to remove the solvent, so as to form a bond between the cellulose and the hydrophobic surface. This results in the formation of a hydrophilic surface coating a layer on the hydrophobic surface. Hydrophilic surfaces as are created in this manner are primarily intended to be utilized on polysulfone surfaces in semipermeable membranes such as are utilized in micro- and ultra-filtration.

10 Claims, No Drawings

HYDROPHILIC SURFACES AND PROCESS FOR MAKING THE SAME

CROSS REFERENCES TO RELATED APPLICATIONS

This application contains subject matter which is related to the subject matter set forth and claimed in the copending U.S. application Ser. No. 06/268,403 filed May 29, 1981 entitled "Semipermeable Membranes and Processes for Making The Same." The entire disclosure of this copending application is incorporated herein by reference. The applicants claim the benefit of the filing date of this copending application for all common subject matter set forth in this application.

BACKGROUND OF THE INVENTION

This invention pertains to new and improved hydrophilic surfaces and to a process for making the same. It is primarily directed toward new and improved semipermeable membranes having hydrophilic surfaces which are intended to be utilized as micro- or ultra-filtration membranes and to a process for making such membranes.

The expression "semipermeable membrane" as used in the preceding is intended to designate a barrier permeated by pores which are large enough to be capable of passing at least some common solvents and which are sufficiently small as to be capable of blocking or holding back comparatively small particles of entrained, colloidal or dissolved substances. Semipermeable membranes having relatively small pores are normally classified as micro-, ultra-filtration or sterilizing membranes depending upon the sizes of the pores in them. Such pore sizes reasonably correspond to the sizes of the largest particles which are capable of passing through these membranes.

An understanding of the invention set forth in this specification does not require a consideration of the sizes of the pores within semipermeable membranes used in various different applications. However, it is considered that an understanding of the present invention is facilitated by recognition of the fact that the speed with which a liquid can move through a porous membrane is quite important from a commercial standpoint. In general, the greater the ability of a porous membrane to pass a liquid such as water the smaller the equipment necessary in order to process a given volume of a suspension or solution so as to separate the liquid in it.

Normally, a so called "bubble point" test involving the measurement of the pressure required to force air through a membrane which has been wetted with water is employed in order to determine if a membrane is free from, or at least is apparently free from, defects such as discontinuities which might interfere with such a separator. As a consequence of the nature of this bubble point test, it is quite important to utilize a semipermeable filter membrane which is hydrophilic in character. This is because a membrane which has lost its ability to be wetted by water may at least in part exhibit the characteristics of a membrane having a ruptured surface when tested utilizing this bubble point test even though, in fact, such a membrane may be without any type of surface defect.

The speed at which a liquid can move through or be forced through a semipermeable membrane is of course related to many different factors. It is not considered that an understanding of this invention requires a discussion relative to the effects on flow rate of items such as: membrane pore size, the rigidity of the membrane so that the pore sizes will not change in accordance with the applied pressure on the membrane, the dimensional stability of the membrane material or materials against other than pressure caused changes during conditions of use, the use of asymmetric pores so as to limit the lengths of the pores at their smallest diameters within the membrane and various other related considerations.

An understanding of the invention should, however, note a related consideration. Preferably any membrane should be of such a character that the flow rate through the membrane will rapidly rise to a normal "working" value for the membrane within a comparatively short time after the initial use of the membrane. Similarly, the membrane should be of such a character that a stable flow through the membrane will be reached within a limited, comparatively short period after the initial use of the membrane.

Although many different semipermeable membranes useful as micro-, ultra-filtration or sterilizing membranes have been developed and, to varying extents, used in the past, it is not considered that such prior membranes have been as desirable as reasonably possible for any one of a variety of different reasons. Some of such prior membranes have been of such a character as to be incapable of satisfactorily passing the so called "bubble point" test briefly discussed in the preceding. Many of such prior membranes do not possess desired flow characteristics. Frequently, such prior membranes have been of such a character that the flow through them under the initial conditions of use has required comparatively prolonged time periods to stabilize.

BRIEF SUMMARY OF THE INVENTION

As a result of considerations as are indicated in the preceding, it is considered that there is a need for new improved micro- or ultra-filtration or sterilizing membranes. It is also considered that this is related to the existence of a need for new and improved hydrophilic surfaces created or provided on hydrophobic polymer surfaces such as are commonly found in existing filtration or sterilizing membranes. These needs are related to a corresponding need for a new and improved process for producing such membranes and such hydrophilic surfaces.

Broadly, the present invention is intended to provide new and improved surfaces, membranes and processes which are intended to fulfill various needs as are briefly indicated in the preceding discussion. More specifically the invention is intended to provide new improved hydrophilic surfaces out of or on hydrophobic surfaces in various different types of membranes. These hydrophilic surfaces are desirable because they will remain hydrophilic under the conditions of use of such membranes, will facilitate flow through such membranes, will aid in stabilizing such flow during the initial periods of use of such membranes and which will aid in preventing false indications of surface discontinuities being apparent when the so called "bubble point" test is used.

The invention is further intended to provide membranes as indicated, which may be easily and conveniently manufactured by treating already known membranes such as are utilized for micro- or ultra-filtration. The invention is also intended to provide processes for producing hydrophilic coatings on polymer surfaces, including such coatings on hydrophilic polymer surfaces within semipermeable membranes, which are simple, relatively inexpensive and easily carried out.

In accordance with this invention, those objectives which are directed towards the combination of a hydrophobic polymer surface and a hydrophilic coating on said hydrophobic surface are achieved by the improvement which comprises said hydrophilic coating consisting of a layer of a cross-linked hydroxyalkyl cellulose which is not removable from said hydrophobic surface as a result of being sterilized by autoclaving.

Those objectives of this invention which are directed towards providing a process are achieved by a process for treating a hydrophobic polymer surface so as to render said surface hydrophilic in character which comprises contacting said surface with a solution of a hydroxyalkyl cellulose and a perfluorocarbon surfactant in a solvent selected from the group consisting of water, and mixtures of water and water miscible aliphatic alcohols so as to provide a layer of said solution on said surface, said surfactant being present in said solution in an amount sufficient to cause said solution to wet substantially all of said surface, said cellulose being present in said solution in an amount effective to form a layer of said cellulose coating said surface upon the removal of solvent from said solution and heating said surface and said layer to a temperature sufficient to remove said solvent from said layer and to a temperature sufficient to cause sufficient insolubilization of said cellulose to hold said cellulose on said polymer surface in the presence of water.

DETAILED DESCRIPTION

In accordance with this invention, hydrophilic surfaces can be provided on a wide variety of different hydrophobic surfaces, produced in a wide variety of different manners. Thus, for example, hydrophilic surfaces can be provided upon membranes having a flat sheet type configuration for micro- or ultra-filtration purposes which have been produced by known or established sintering, drying or fissuring techniques or which have been formed by creating a film of a "dope" of a polymer or polymer system in a solvent or solvent system and then quenching the dope into a coagulating liquid.

Normally, the membrane produced by such quenching will be washed one or more times and will be dried or heated so as to develop desired ultimate properties. On occasion, such a membrane will consist of superimposed layers of material or will be supported by porous sheets or tissues, which are sufficiently thick so as to reinforce the membrane to a sufficient extent to minimize the chances of tearing or puncture during the handling or use of the membrane. On occasion these membranes may be formed so as to have shapes such as hollow fibers or tubes.

This invention is concerned with membranes formed in accordance with prior techniques as indicated in the preceding which have hydrophobic surfaces and more specifically hydrophilic surfaces located so as to be contacted with any liquid in moving through the membrane. A wide variety of different polymer materials are, of course, of a hydrophobic character and are capable of being utilized so as to be exposed at the surface of a membrane as indicated in the preceding discussion. It is considered that no useful purpose would be achieved by tabulating in this specification all known hydrophobic polymers which can be treated so as to be provided with a hydrophilic surface. Some halocarbon polymers such as polytetrafluoro ethylene cannot be processed in accordance with this invention.

It is also considered that the present invention is particularly suitable for use in treating the surfaces of polysulfone and polyimide polymer surfaces such as may be utilized in membranes such as are employed for micro- or ultra-filtration. It is considered that the present invention is especially important in the treatment of polysulfone surfaces so as to achieve permanent hydrophilic surfaces which have flow and other characteristics as are desirable in such membranes.

The achievement of such a hydrophilic surface requires contacting a hydrophilic polymer surface as noted with a solution of a hydroxyalkyl cellulose and of a perfluorocarbon non-ionic surfactant or wetting agent in either water or a mixture of water and aliphatic alcohol for a time period which is sufficient so that the solution throughly wets the surface in order to form a layer of the solution on substantially all of the surface. Normally, the intent is to completely cover all exposed portions of the hydrophobic polymer surface so that ultimately the entire polymer surface will be rendered hydrophilic in character. If the hydrophobic surface is not uniformly covered or coated with a continuous layer of the solution, the final hydrophobic surface produced will tend to be discontinuous in character or will be of a comparatively non uniform hydrophilic character.

Within the broad scope of the present invention, any hydroxyalkyl cellulose compound can be utilized in a solution as indicated in the preceding discussion. The particular cellulose compound used should, of course, be capable of going into solution in the solvent or the solvent system employed, should be capable of forming a comparatively thin, reasonably uniform coating over a hydrophobic surface, should be capable of penetrating even the smallest pores within a hydrophobic ultra- or micro-filtration membrane and should be sufficiently reactive so as to be capable of cross-linking with itself. This results in it being permanently bonded to such a surface.

It is considered that, broadly, any hydroxyalkyl cellulose in which the alkyl radical contains from one to six carbon atoms, inclusive, and having an average molecular weight of from about 10,000 to about 1,000,000 can be utilized to form a hydrophilic surface as herein indicated utilizing a solvent or solvent system as previously indicated. Particularly satisfactory results in forming a hydrophilic film, coating or layer on a polysulfone, hydrophobic filtration membrane can be achieved by utilizing a hydroxyalkyl cellulose composition having an average molecular weight of from about 20,000 to about 60,000. A proprietary alkyl cellulose composition sold by Hercules, Inc., Wilmington, Del., U.S.A., under the trademark Klucel is suitable for use in practicing the invention.

The wetting agent or surfactant employed in a solution as indicated in the preceding is used for the purpose of facilitating the covering or wetting of a hydrophobic surface by the solution. When, as is preferred in accordance with this invention, this surface is a surface of a semipermeable membrane such as a membrane capable of being employed as an ultra- or a micro-filtration membrane, the surfactant used must be particularly effective in enabling the solution to wet the interiors of all of the pores within such a membrane so that substantially all of the exposed surface of the membrane normally contacted by a liquid during the use of the membrane for filtration purposes will be covered with the coating as indicated. Further, the surfactant used should aid in the avoidance of the solution plugging any of the pores of the membrane.

Further, the surfactant used preferably is of such a character that it will either be capable of being easily removed from a membrane by washing after the membrane is completely manufactured or of such a character that it will be inert or substantially inert under the condition of use of the membrane. Preferably, any surfactant used will have both such inertness and the ability to be removed or washed from the membrane. Because of the possibility that some of the surfactant used may not be removed from the final surface or membrane, it is normally considered mandatory that the surfactant used be non-toxic in character.

It has been found that non-ionic perfluorocarbon surfactants are particularly desirable for use with the invention because they are relatively inert under the normal conditions of use of an ultra-filtration membrane and because they are normally capable of being washed from a membrane as the membrane is initially contacted with water or another solvent. Any such membrane formed using a perfluorocarbon surfactant is particularly resistant to heat caused stress cracking. This is considered quite important. Other commonly used surfactants are considered to cause a decrease in the mechanical problem of a membrane due to thermally induced cracking. Such surfactants are particularly surface active in comparatively low concentrations. A particularly suitable perfluorocarbon surfactant for use with the present invention is sold by E. I. DuPont de Nemours and Company, Wilmington, Del., under the trademark Zonyl FSN.

The solvent or the solvent system involved should, of course, be effective in placing in the solution a hydroxyalkyl cellulose compound and a surfactant as discussed in the preceding, so as to form a solution in which the surfactant is effective for its intended purpose of enabling the solution to wet a surface. Further, the solvent or solvent system used should preferably be of such a character that no harm will result if, for some unknown reason, a minute quantity of the solvent should remain in the final product in accordance with this invention.

Also, the solvent or solvent system employed should be substantially inert with respect to both the hydroxyalkyl cellulose used and a hydrophobic surface contacted by the solution during the application of the solution. It is considered that some minor amounts of swelling of such a surface or the like are not significant enough so as to influence the selection of the solvent or the solvent system. As a result of these requirements, it is considered that it is desirable to utilize water as a solvent, but that it is equally permissible to utilize a mixture of water and one or more lower aliphatic alcohols containing no more than four carbon atoms.

The proportions of the ingredients in the solution as noted can be varied within comparatively limited ranges. The solution should contain an amount of the cellulose compound which is effective to form a layer of the cellulose compound coating or substantially completely coating a hydrophobic surface treated with the solution. Such an amount of the cellulose compound will vary in accordance with the specific surfactants used and the solvent employed. Also, the ability of the solution to cover a hydrophobic surface will vary depending upon other factors not specifically enumerated in this discussion.

As a result of experimental work, it is believed that a solution as noted should contain from about 0.02 to about 2.00 percent by weight of a cellulose compound as noted. Preferred results are achieved when the solution contains from about 0.03 to about 0.06 percent by weight of the cellulose compound. It is considered preferable that 0.04 percent by weight of a cellulose compound having an average molecular weight of about 30,000 is used. In general, if less of such a compound is present in the solution, the solution may not cover a hydrophobic surface adequately. On the other hand, if an excess over the range period of a cellulose compound is present, there may be difficulty in formulating a solution which will adequately penetrate the interstices of a hydrophobic surface.

The amount of the surfactant used can be varied in accordance with the factors as are briefly indicated in the preceding discussion. It is presently considered that the solution employed should contain from about 0.001 to about 0.5 percent by weight of the surfactant. If less surfactant than indicated by this range is used, in general the solution will tend not to be effective to adequately penetrate and wet the hydrophobic surface. On the other hand, if a greater amount of surfactant is used than is indicated by this range, an economic waste is achieved, since there is no need for such an excess. The balance of any solution used should, of course, be a solvent or solvent system as noted. Preferred results are achieved using from about 0.005 to about 0.03 percent by weight of the surfactant. Particularly desirable results are achieved with the use of 0.023 percent of the Zonyl surfactant noted in the preceding.

The solution indicated in the preceding is used by applying it to a hydrophobic surface such as the surface of a filtration membrane under such conditions as to promote the solution contacting and wetting substantially all of the exposed hydrophobic surface. A number of different techniques can be utilized to accomplish the objective of such contact. As an example of this, a membrane can be soaked in a solution as noted. A roll of membrane material which was loosely wound or wound with spacers between the membrane can be vacuum impregnated in the manner in which a dielectric is impregnated within an electrostatic capacitor, or the solution may be forced through the membrane or up against the membrane, under such conditions that the pressure applied to the solution brings it in intimate contact with the surface.

After such contact, any excess solution—i.e., solution which is not held in place as a result of the solution wetting the hydrophobic surface—should be removed from or drained off the surface (or membrane), since there is no point in having such an excess solution present during further processing. Such further processing involves heating the coated or covered hydrophobic surface—and, of course, the complete article upon which the surface is located—under such conditions that at least a degree of cross-linking occurs in the cellulose present and possibly with the hydrophobic polymer present at the surface which insolubilizes the cellulose.

Probably, the cross-linking forms a gel type network coating which physically engages the surface irregularities of the hydrophobic polymer surface. This cross-linking is preferably carried out to the extent necessary so that the hydrophilic surface layer or coating produced is sufficiently insoluble that it cannot be removed under the normal conditions of use of the membrane. Thus, the cross-link hydrophilic polymer material will be stable on the hydrophilic surface even when a membrane is subjected to repeated autoclaving. In general, any cross-linking in excess of that necessary to achieve an adherent, insoluble coating of film as noted is unnecessary, and, if extensive, may detract from the ultimate hydrophilic properties desired in the film.

Such cross-linking is promoted or caused by heat; such heating is also to remove the solvent or solvent system employed. This cross-linking obviously involves the usual time-temperature consideration in connection with the chemical reaction. The higher the temperature employed to remove the solvent and to cause the cross-linking, the shorter the time required to accomplish the desired degree of cross-linking of the cellulose. It is presently considered that particularly effective results can be achieved by merely heating a surface coated with the solution as indicated in the preceding to a temperature of from about 110 to 190 degrees C. for a period of from about 10 minutes to about 30 seconds. The longer period should be used with the lower temperature and the shorter period should, of course, be used with the higher temperature. If lower temperatures than indicated are used, there is a chance that the solvent or the solvent system may not be completely removed. If a period at such a temperature is undesirably short, there is danger of not achieving sufficient cross-linking so that the cellulose will not be removed from the hydrophilic surface during conditions of use. If a temperature and time period above those indicated are used, there is danger that damage or extensive cross-linking will preclude the coating or layer of cellulose obtained from effectively performing its intended function.

After a hydrophobic surface has been coated and heated as indicated and then allowed to cool to the normal ambient temperature, the hydrophobic surface is rendered hydrophilic as a result of the formation of an inherent cellulosic coating as noted. A membrane useful for filtration purposes created in this manner can be directly used or can be used after having been washed so as to remove at least a significant amount of the surfactant employed. The use of an excess of the surfactant over that necessary to obtain wetting of a hydrophobic surface aids in the removal of any cellulose compound which has not been bonded to the hydrophobic surface during such washing.

A filtration membrane created as indicated, is considered to be particularly desirable from a number of different points of view. When such a membrane is tested utilizing the bubble point test indicated in the preceding, there is little danger of such a membrane giving a false indication of the presence of a surface defect. A membrane as noted is quite desirable in that as it is initially used in a filtering operation, the flow rate through the membrane will be relatively high and will quickly achieve a stable, uniform value.

It is considered a surface treatment as herein described so as to produce a hydrophilic surface on a hydrophobic surface should not be significantly detrimental to the flow characteristics of a filter membrane. Preferably, any filter membrane in accordance with this invention will pass through a corresponding filter membrane having a hydrophobic surface which has not been treated in accordance with this invention when both membranes are used under identical conditions. The fact that such a flow rate can be achieved after a surface treatment as noted is significant. Preferably, any filter membrane herein described should be free, or substantially free, from any detectable pore plugging resulting from a treatment as described.

We claim:

1. A process for treating a hydrophobic polymer surface so as to render said surface hydrophilic in character which comprises:
   contacting said surface with a solution of a hydroxyalkyl cellulose and a perfluorocarbon surfactant in a solvent selected from the group consisting of water, and mixtures of water and water miscible aliphatic alcohols so as to provide a layer of said solution on said surface, said surfactant being present in said solution in an amount sufficient to cause said solution to wet substantially all of said surface, said cellulose being present in said solution in an amount effective to form a layer of said cellulose coating said surface upon the removal of solvent from said solution, and
   heating said surface and said layer to a temperature sufficient to remove said solvent from said layer and to a temperature sufficient to cause sufficient insolubilization of said cellulose to hold said cellulose on said polymer surface in the presence of water.

2. A process as claimed in claim 1 wherein:
   said polymer present at said polymer surface is selected from the group consisting of polysulfone and polyimide polymers, and
   the alkyl radical in said hydroxyalkyl cellulose contains from 1 to 6 carbon atoms,
   said hydroxyalkyl cellulose has an average molecular weight from about 10,000 to about 1,000,000.

3. A process as claimed in claims 1 or 2 wherein:
   said solution contains from about 0.02 to about 2.00 percent by weight of said hydroxyalkyl cellulose, from about 0.001 to about 0.5 percent by weight of said surfactant and the remainder of said solution consists of said solvent.

4. A process as claimed in claim 1 wherein:
   said hydrophobic polymer surface forms a part of a filter membrane,
   said polymer surface is a polysulfone polymer surface,
   the alkyl radical contains from about 1 to 6 carbon atoms,
   said surface and said layer are heated to a temperature of from about 120° to about 190° C. for a period of from about 10 minutes to about 30 seconds.

5. A process as claimed in claim 1 wherein:
   said hydrophobic surface is a porous filter surface;
   said polymer and said hydrophobic polymer surface is a polysulfone polymer;
   said alkyl radical in said hydroxy cellulose contains from one to six carbon atoms;
   said hydroxy cellulose has an average molecular weight of from about 20,000 to about 60,000.

6. A process as claimed in claim 5 wherein:
   said membrane is useful for micro- and ultra-filtration purposes;
   said solution contains about 0.04 percent by weight of said cellulose and said solution contains about 0.023 percent by weight of said surfactant, and
   said cellulose has an average molecular weight of about 30,000.

7. In the combination of a hydrophobic polymer surface and a hydrophilic coating on said hydrophobic surface, the improvement which comprises:

said hydrophilic coating consisting of a layer of cross-linked hydroxyalkyl cellulose which is not removable from said hydrophobic surface as a result of being sterilized by autoclaving.

8. A combination as claimed in claim 7 wherein:

said polymer present at said hydrophobic polymer surface is selected from the group consisting of polysulfone and polyimide polymers, and said radical in said hydroxyalkyl cellulose contains from 1 to 6 carbon atoms, said hydroxyalkyl cellulose has an average molecular weight of from about 10,000 to about 1,000,000.

9. The combination claimed in claim 7 wherein:

said hydrophobic polymer surface is a part of a filter membrane, said hydrophobic polymer is a polysulfone polymer, said cellulose is hydroxypropyl cellulose has an average molecular weight of from about 20,000 to about 60,000.

10. The combination claimed in claim 7, 8 or 9 wherein:

said hydrophilic surface is a porous surface and said combination has at least 90 percent of the flow capacity of said uncoated hydrophobic surface in the absence of said hydrophilic coating.

* * * * *

UNITED STATES PATENT AND TRADEMARK OFFICE
CERTIFICATE OF CORRECTION

PATENT NO.   : 4,413,074
DATED        : November 1, 1983
INVENTOR(S)  : Wolfgang J. Wrasidlo and Karol J. Mysels It is certified that error appears in the above-identified patent and that said Letters Patent is hereby corrected as shown below:

Column 6, line 9, "that" should read --when--;

Column 6, line 14, "period" should read --noted--;

Column 7, line 65, after the word "pass" insert the words --at least 90 percent of the quanity of water which will be passed--.

Signed and Sealed this

Twenty-fourth Day of July 1984

[SEAL]

Attest:

GERALD J. MOSSINGHOFF

Attesting Officer

Commissioner of Patents and Trademarks